UNITED STATES PATENT OFFICE.

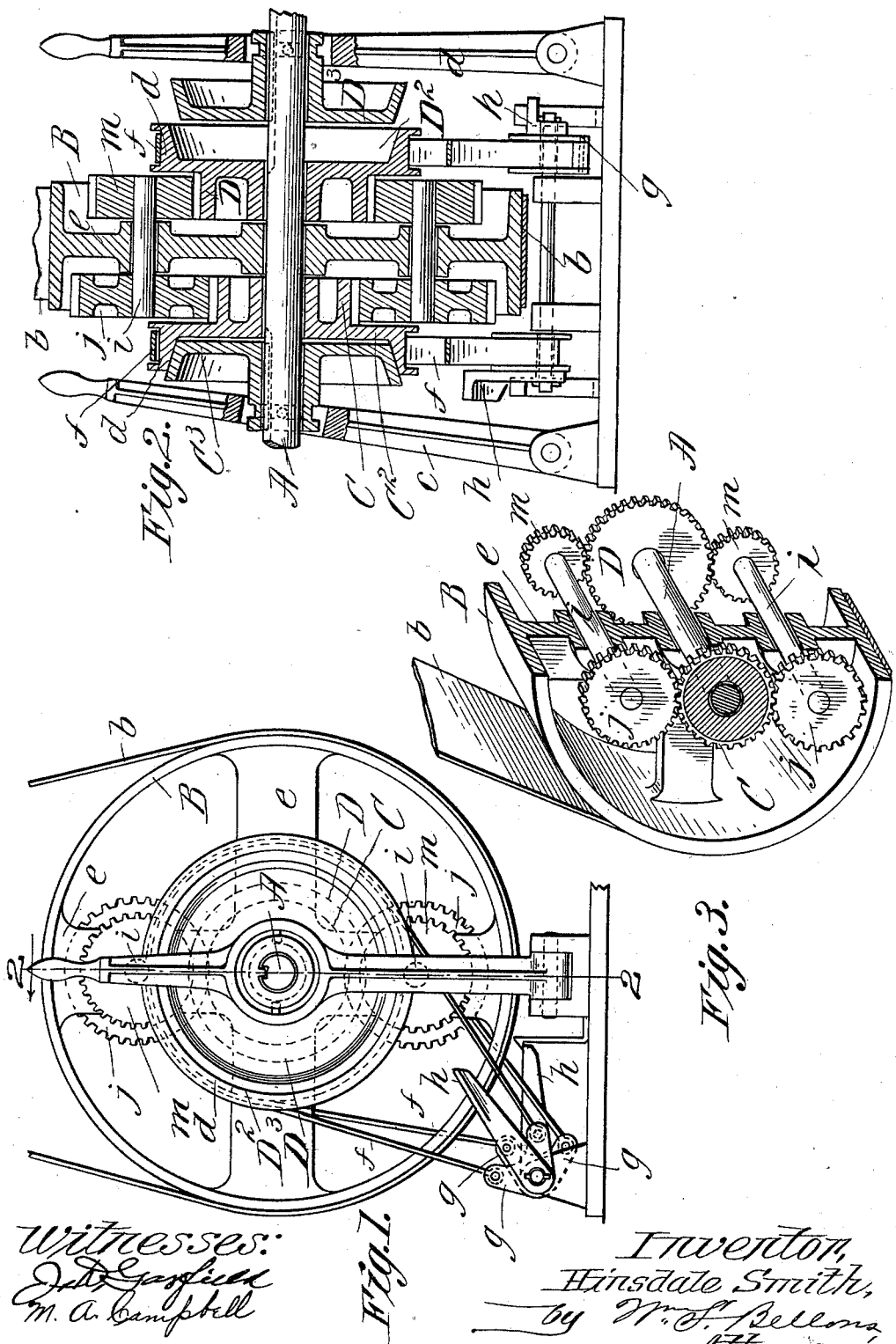

HINSDALE SMITH, OF SPRINGFIELD, MASSACHUSETTS.

VARIABLE-SPEED GEARING.

SPECIFICATION forming part of Letters Patent No. 626,444, dated June 6, 1899.

Application filed July 6, 1898. Serial No. 685,227. (No model.)

*To all whom it may concern:*

Be it known that I, HINSDALE SMITH, a citizen of the United States of America, and a resident of Springfield, in the county of Hampden and State of Massachusetts, have invented certain new and useful Improvements in Variable-Speed Gearing, of which the following is a full, clear, and exact description.

This invention relates to improvements in variable speed and power gearing, the same being available for utilization in motor-vehicles, steam-launches, and otherwise in numerous situations in which a mechanism having the capabilities and adaptation of the present one will be suggested.

The object of the invention is to provide a novel gearing mechanism for the transmission of speed whereby the driven part may be rotated at the same speed and in the same direction as the driving part, and, furthermore, in which the driven part may be rotated in the same direction or in a reverse direction at a different speed from that of the driver, or whereby the one part may be driven in the same direction at one time and in the reverse direction at another time, as occasion may require, at different speeds from that of the driving part, which mechanism has the capabilities of affording the different driving and power-transmission effects by the essential employment therein of a remarkably few parts and wheels, all conducive to cheapness, lightness, and general efficiency.

The invention consists in the construction and arrangement or combination of parts, all substantially as hereinafter fully and clearly described, and set forth in the claims.

Figure 1 is an end elevation of the change-speed and reversing driving gear. Fig. 2 is a central vertical section of the same, taken on the line 2 2, Fig. 1. Fig. 3 is a perspective and sectional view not strictly conforming in proportion to the preceding figures, but designed to show more readily the relative arrangement of the several gears one to the other and to the driving and driven parts.

Similar characters of reference indicate corresponding parts in all of the views.

In the drawings, A represents a shaft which under the one aspect of this mechanism is to be regarded as the driven part, and B represents a pulley-like wheel loosely mounted to turn about said shaft, constituting the driving part, $b$ indicating a driving-belt therefor. The wheel B is constructed with a widened rim and a web or spokes $e$ uniting its hub and said rim.

C and D represent spur gear-wheels of unequal diameters loosely mounted on the shaft A at opposite sides of the wheel B, each having a clutch member $C^2$ $D^2$ at its outer end, and splined on the shaft outside of each gear-wheel is the clutch member $C^3$ $D^3$, having combined therewith the operating-levers $c$ and $d$ for throwing the sliding splined clutch members into or out of connection with the said gear-wheels, whereby at pleasure each is rendered fast on or loose from the shaft, and the outer portion of each gear-wheel C D is, moreover, constructed with a grooved cylindrical portion $d$, about which is the respectively-provided strap $f$, the approached ends of each thereof being connected to the arms $g$ $g$ of an angular lever, the location of which is suitably radially distant from the strap-surrounding cylindrical part, and each of these two armed levers is mounted to rock on a journal or pivot shaft and has an operating-lever $h$, whereby to oscillate it for the purpose of leaving the strap free or of tightening it about the cylindrical portion of the gear-wheel, all in a well-known manner, the strap and its tightener constituting in themselves no invention.

The wheel B carries between its hub and rim the journal-shaft $i$, the length of which is parallel with the axis of the wheel B, said shaft being bodily revoluble in unison with the said wheel by which it is carried and also independently rotatable on its own axis, and this journal-shaft $i$ has fixed on the opposite ends thereof, located at opposite sides of the wheel B, the spur gear-wheels $j$ and $m$ of unequal diameters, the one being in mesh with the gear-wheel C and the other in mesh with the gear-wheel D, and both while rotating in unison are also revoluble around on said gears, with which they respectively mesh.

In the drawings the journal-shaft $i$ and a spur gear-wheel $j$ and $m$ are shown duplicated at diametrically opposite locations on the gear-carrying wheel B. The provision of the second journal shaft or arbor $i$ and the two gear-wheels thereon is by no means a necessity to the operativeness of the mechanism;

but these are preferably employed for the purposes of equilibrium, and, again, instead of paired sets of these gear-carrying journals more than two thereof may be employed.

This mechanism referred to in connection with the drawings is capable under different conditions of giving two speed motions, the first in the direction of that of driver B only partially as fast, the second, reversed of that of driver, also only partially as fast, and in addition a speed in same direction and at the same speed with the driver. Assuming, as an example, that the gear-wheel C is unrestrained by its strap and by the clutch united to the shaft and that the gear-wheel D is unclutched from the shaft and by its strap held against being rotated, the rotation of the gear carrier or driver B, carrying the gears $j$ and $m$, will cause a rotation of the gear $j$ in the same direction as that of the rotation of the driver B, but with greater frequency of rotation, if the gear D, which is restrained, has more teeth than the gear $m$, revolving around and in mesh with it, so that if, for instance, gear D has twenty-four teeth and the gear $m$ has sixteen teeth a complete revolution of $m$ around D will cause $m$ to be rotated on its own axis one and one-half times in the same direction as it revolves, and the gear-wheel $j$, assumed to have twenty teeth, (which meshes into the equal-sized gear C, coupled to the shaft;) while it has during one revolution thereof its one and one-half rotations, by reason of also revolving completely around the gear-wheel C will cause gear C and the shaft to be turned one-half a rotation to every rotation of the driver B and in the reverse direction from that of the driver. Assuming, again, that gear C is unclutched from the shaft and restrained by its tightened strap against being turned and gear D is clutched to the shaft and by its loosened strap left free to turn, it will be found that each revolution of the driver will cause the gear $j$, carried thereby, to be rotated once in the same direction that the driver revolves, and each concurrent rotation of the connected gear $m$, revolving around and in mesh with the gear-wheel D of greater diameter in making each complete revolution about said gear, causes that gear and the shaft to be revolved a fraction of a turn equal to the difference between the number of teeth in wheel $m$ and the number in gear-wheel D and in the same direction—that is to say, with the relative number of gear-teeth mentioned the driver B will rotate the shaft in the same direction, but only one-third as fast. By holding one of the strap-surrounded gears and leaving the other unclutched the driver B will be without effect in its rotation to turn the shaft. By loosening the straps for both gears and throwing both these gears into clutch with the shaft the shaft will be driven equally with the driver B in the same direction—that is, as one with it—for the two clutches together through the connected gearing lock the wheel to the shaft, and if now one or both of the straps are placed in bind about the cylindrical portions of their respectively adjacent gear-wheels C or D they may be utilized as brakes to reduce the speed of the mechanism as driven by the belt.

The driving-power may be applied through the shaft A and the same speed forward or different speeds, forward or reversed, imparted to the gear-carrying wheel B, this obviously being merely a reversal in the manner of using the mechanism which will be more available in some cases, and by changing the relative sizes of the various gear-wheels correspondingly different relative speeds may be acquired in the driven part from that of the driving part to provide for various requirements, besides retaining the capability of causing the one to be driven in unison with the other.

I claim—

1. In a variable-speed mechanism, a rotatable part, a shaft about which it is rotatable, having two gears of varying sizes both directly and loosely mounted on said shaft, means for temporarily connecting one of said gears as a fixture to the shaft, gear-wheels of varying sizes revolubly carried by the said first-named rotatable part respectively in mesh with the said gears concentrically on the shaft, and means for temporarily restraining the one of the two shaft-surrounding gears which is not connected to the shaft from being turned.

2. In a variable-speed gearing, a rotatable part, a shaft relative to which it is rotatable, having two gears of varying sizes directly and loosely mounted on said shaft, means for temporarily connecting and disconnecting each gear independently to or from the shaft, united gear-wheels of varying sizes revolubly carried by the first-named rotatable part and rotatable thereon, and respectively in mesh with the said gears on the shaft, and devices independently operating to restrain or release said gears which are on the shaft.

3. In a speed-gearing, a rotatable part, a shaft relative to which it is rotatable, having two gears of varying sizes concentrically thereof, and loose thereon, each provided with a cylindrical restraining member $d$ and a clutch member, straps encircling said cylindrical members and strap-operating devices, clutch members on the shaft rotatable therewith, but axially movable thereon to engage said gear-provided cylindrical restraining members and means for operating them, substantially as described, and united gear-wheels of varying sizes revolubly carried by the first-named rotatable part and rotatable thereon, and respectively in mesh with the said gears concentrically on the shaft, substantially as described.

4. In a variable-speed gearing, a shaft, a wheel B loosely mounted thereon, gear-wheels C and D of varying sizes loosely mounted on said shaft to turn, at opposite sides of said wheel, a journal-shaft revolubly carried by said wheel B and having fixed thereon at opposite sides of the wheel, gear-wheels of different sizes in mesh with said gear-wheels C D, clutch devices independently operating for temporarily connecting each said gear C and D to the shaft, and independent restraining means for each said gear-wheel C D, for preventing its rotation, substantially as described.

5. In a variable-speed mechanism, the combination with the shaft A having the wheel B normally loosely mounted thereon and having at opposite sides thereof the loosely-mounted gear-wheels C and D of different sizes, each having a cylindrical portion $d$ and each comprising a clutch member, of the journal-shaft $i$ revoluble with, and rotatable upon, the said wheel B, having fixed thereon the gear-wheels $j\ m$ of different sizes, the clutch members $C^3$ and $D^3$ spline-engaged and endwise movable on the shaft and means for independently operating them, the straps $f\,f$ around the said cylindrical portions $d$, the angular levers $g$ with which the ends of the strap are connected, and the operating-levers $h$ therefor, all substantially as described, and for the purposes set forth.

Signed by me, at Springfield, Massachusetts, this 25th day of June, 1898.

HINSDALE SMITH.

Witnesses:
    WM. S. BELLOWS,
    M. A. CAMPBELL.